(12) United States Patent
Oe et al.

(10) Patent No.: US 12,431,980 B2
(45) Date of Patent: Sep. 30, 2025

(54) OPTICAL TRANSCEIVER, OPTICAL COMMUNICATION SYSTEM, OPTICAL TRANSMISSION APPARATUS, OPTICAL TRANSCEIVER SETTING METHOD, AND COMPUTER READABLE MEDIUM

(71) Applicant: NEC Corporation, Tokyo (JP)

(72) Inventors: Masaki Oe, Tokyo (JP); Rintaro Nomura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 18/022,944

(22) PCT Filed: Aug. 31, 2020

(86) PCT No.: PCT/JP2020/032894
§ 371 (c)(1),
(2) Date: Feb. 23, 2023

(87) PCT Pub. No.: WO2022/044327
PCT Pub. Date: Mar. 3, 2022

(65) Prior Publication Data
US 2023/0327769 A1 Oct. 12, 2023

(51) Int. Cl.
*H04B 10/40* (2013.01)
*H04B 10/572* (2013.01)

(52) U.S. Cl.
CPC ........... *H04B 10/40* (2013.01); *H04B 10/572* (2013.01)

(58) Field of Classification Search
CPC .............................. H04B 10/40; H04B 10/572
(Continued)

(56) References Cited

U.S. PATENT DOCUMENTS 8,649,681 B2 * 2/2014 Ohlen ................. H04J 14/0235
398/72
9,866,329 B2 * 1/2018 Ho ....................... H04B 10/506
(Continued)

FOREIGN PATENT DOCUMENTS

EP 2773056 A1 * 9/2014 ......... H04B 10/0779
EP 3917045 A1 * 12/2021 ............ H04B 10/40
(Continued)

OTHER PUBLICATIONS

JP Office Action for JP Application No. 2022-545258, mailed on Mar. 12, 2024 with English Translation.
(Continued)

*Primary Examiner* — Amritbir K Sandhu
(74) *Attorney, Agent, or Firm* — Sughrue Mion, PLLC

(57) ABSTRACT

A wavelength variable optical transmitting unit is configured to be able to transmit a first channel setting optical signal including first channel information indicating a channel for the first channel setting optical signal. A wavelength variable optical receiving unit is configured to, when the optical transceiver receives a second channel setting optical signal from another optical transceiver, transfer second channel information contained in the second channel setting optical signal and indicating a channel for the second channel setting optical signal. A control unit is configured to control the wavelength variable optical transmitting unit and the wavelength variable optical receiving unit. The control unit sets, based on the second channel information that the wavelength variable optical receiving unit has transferred, a first channel indicated by the second channel information as a channel through which the wavelength variable optical receiving unit receives an optical signal.

12 Claims, 9 Drawing Sheets

(58) Field of Classification Search
USPC .......................................................... 398/135
See application file for complete search history.

(56) References Cited

U.S. PATENT DOCUMENTS

| | | | |
|---|---|---|---|
| 2007/0077072 A1* | 4/2007 | Kunimatsu | H04J 14/0227 |
| | | | 398/135 |
| 2008/0166127 A1 | 7/2008 | Kazawa et al. | |
| 2013/0004174 A1* | 1/2013 | Lee | H04B 10/272 |
| | | | 398/79 |
| 2015/0309258 A1* | 10/2015 | Fincato | G02F 1/011 |
| | | | 398/87 |
| 2017/0237518 A1 | 8/2017 | Yang | |
| 2020/0073196 A1 | 3/2020 | Yutani | |
| 2021/0184773 A1* | 6/2021 | Park | H04B 10/506 |
| 2021/0273406 A1* | 9/2021 | Lee | H01S 5/0687 |
| 2021/0376948 A1* | 12/2021 | Park | H04J 14/0264 |
| 2021/0397063 A1 | 12/2021 | Yutani | |
| 2022/0263583 A1* | 8/2022 | Kim | H04B 10/40 |
| 2023/0327769 A1* | 10/2023 | Oe | H04B 10/40 |
| | | | 398/135 |

FOREIGN PATENT DOCUMENTS

| | | | |
|---|---|---|---|
| JP | H07-264209 A | | 10/1995 |
| JP | H11-191794 A | | 7/1999 |
| JP | 2005-229298 A | | 8/2005 |
| JP | 2005-229299 A | | 8/2005 |
| JP | 2007-097068 A | | 4/2007 |
| JP | 2007-324885 A | | 12/2007 |
| JP | 2008-172351 A | | 7/2008 |
| JP | 2009-290594 A | | 12/2009 |
| JP | 2010041444 A | * | 2/2010 |
| JP | 2017-539142 A | | 12/2017 |
| JP | 2020-110014 A | | 7/2020 |
| WO | WO-2023084649 A1 | * | 5/2023 ............. H04B 10/40 |

OTHER PUBLICATIONS

International Search Report for PCT Application No. PCT/JP2020/032894, mailed on Nov. 24, 2020.
JP Official Communication for JP Application No. 2022-545258, mailed on Jan. 28, 2025 with English Translation.
JP Office Communication for JP Application No. 2024-165083, mailed on Aug. 5, 2025 with English Translation.

* cited by examiner

OPTICAL TRANSCEIVER, OPTICAL COMMUNICATION SYSTEM, OPTICAL TRANSMISSION APPARATUS, OPTICAL TRANSCEIVER SETTING METHOD, AND COMPUTER READABLE MEDIUM

This application is a National Stage Entry of PCT/JP2020/032894 filed on Aug. 31, 2020, the contents of all of which are incorporated herein by reference, in their entirety.

TECHNICAL FIELD

The present invention relates to an optical transceiver, an optical communication system, an optical transmission apparatus, an optical transceiver setting method, and a computer readable medium.

BACKGROUND ART

Optical communication systems that connect base stations located on land with each other through optical cables, thereby enabling them to perform optical communication with each other have been widely used. In each base station, an optical transmission apparatus with at least one optical transceiver provided therein is provided. When the optical transceiver is used for the first time, the initial setting of the optical transceiver is carried out.

A technology in which a transmission rate, a data format, and a transmission format are adjusted prior to data communication, and then communication between optical transceivers is started has been disclosed (Patent Literature 1). In this technology, a test signal in which the transmission rate and the transmission format between the optical transceivers are set is transmitted and received between the optical transceivers. The transmission rate is set based on a comparison between the transmission rate used for the transmission of the test signal and the transmission rate of the received test signal. The transmission format is set according to the conditions of the transmission line that are inferred based on the detection of errors in the test signal. The data format is determined by transmitting and receiving information about the data format after the transmission rate and the transmission format are determined. After these formats are determined, communication between the optical transceivers is started.

Further, a technique in which two-way communication of data packets is started between optical transceivers which are in a non-communication state has been proposed (Patent Literature 2). In this technique, prior to the two-way communication of data packets, a connection packet which contains specific information of each of the optical transceivers and of which the transmission rate is equal to or lower than the transmission rate for the data packets is transmitted and received between the optical transceivers through an optical fiber transmission line. Then, one of the optical transceivers is set as a master and the other optical transceiver is set as a slave according to the specific information contained in the connection packet received by each of the optical transceivers. Further, a transmission method set in the master optical transceiver is notified (i.e., sent) to the slave optical transceiver by using a setting packet. The two-way communication between the optical transceivers is performed according to the transmission method set by the aforementioned notification.

Further, a technique in which a wavelength used for communication between optical modules is negotiated in a PON (Passive Optical Network) system composed of an OLT (Optical Line Terminal) and an ONU (Optical Network Unit) has been proposed (Patent Literature 3). In this technique, one of the optical modules (referred to as a first optical module) periodically transmits a wavelength idle signal having a selected first wavelength to the other optical module (referred to as a second optical module). The wavelength idle signal indicates that the selected first wavelength is usable, and the second optical module, which has received the wavelength idle signal, transmits a wavelength request message to the first optical module at a second wavelength corresponding to the first wavelength. When the first optical module receives the wavelength request message, it transmits a wavelength permission message to the second optical module in order to permit the second optical module to use the selected wavelength. In this way, the wavelength used for transmitting and receiving optical signals between the two optical modules is determined.

CITATION LIST

Patent Literature

Patent Literature 1: Japanese Unexamined Patent Application Publication No. 2005-229298
Patent Literature 2: Japanese Unexamined Patent Application Publication No. 2005-229299
Patent Literature 3: Published Japanese Translation of PCT International Publication for Patent Application, No. 2017-539142

SUMMARY OF INVENTION

Technical Problem

In an optical transmission apparatus, in general, a plurality of optical transceivers are provided, and it is necessary to perform, for each of the optical transceivers, the initial setting for setting a channel(s) (a wavelength(s)) that the optical transceiver uses for transmission and reception. In such a case, if the channel setting is manually performed for each of a large number of optical transceivers provided in the optical transmission apparatus, it takes an enormous amount of time for the setting operation. Therefore, in order to reduce the working time, it is desirable if the optical transceiver can autonomously set the channel(s) through which it transmits and receives optical signals as one of the initial setting processes when the optical transceiver is mounted in the optical transmission apparatus.

In the technique disclosed in Patent Literature 3, the channel (the wavelength) used for transmission and reception can be set through a negotiation between the two optical modules (the two optical transceivers). However, to begin with, the technique is based on the prerequisite that optical signals can be transmitted and received between the two optical modules through specific channels. In other words, the first and second wavelengths to be used have to be manually assigned. That is, the technique disclosed in Patent Literature 3 merely makes it possible to confirm, by using assigned channels, that transmission and reception lines can be used, but cannot make it possible to autonomously set a channel(s) to be used.

The present invention has been made in view of the above-described circumstances, and an object thereof is to enable an optical transceiver to autonomously set a channel(s) through which optical signals are transmitted and received.

Solution to Problem

An optical transceiver according to an aspect of the present invention includes: a wavelength variable optical transmitting unit configured to be able to transmit a first channel setting optical signal including first channel information indicating a channel for the first channel setting optical signal; a wavelength variable optical receiving unit configured to, when the optical transceiver receives a second channel setting optical signal from another optical transceiver, transfer second channel information contained in the second channel setting optical signal and indicating a channel for the second channel setting optical signal; and a control unit configured to control the wavelength variable optical transmitting unit and the wavelength variable optical receiving unit, in which the control unit sets, based on the second channel information that the wavelength variable optical receiving unit has transferred, a first channel indicated by the second channel information as a channel through which the wavelength variable optical receiving unit receives an optical signal.

An optical communication system according to an aspect of the present invention includes: a first optical transmission apparatus including; a plurality of optical transceivers including a first optical transceiver; and a first optical multiplexing/demultiplexing unit configured to multiplex and output optical signals output from the plurality of optical transceivers, and demultiplex a received optical signal into optical signals for the plurality of optical transceivers according to a channel; a second optical transmission apparatus including: a plurality of optical transceivers including a second optical transceiver; and a second optical multiplexing/demultiplexing unit configured to multiplex and output optical signals output from the plurality of optical transceivers, and demultiplex a received optical signal into optical signals for the plurality of optical transceivers according to the channel; and an optical cable connecting the first and second optical transmission apparatuses with each other, in which the first optical transceiver includes: a wavelength variable optical transmitting unit configured to be able to transmit a first channel setting optical signal including first channel information indicating a channel for the first channel setting optical signal; a wavelength variable optical receiving unit configured to, when the first optical transceiver receives a second channel setting optical signal from the second optical transceiver, transfer second channel information contained in the second channel setting optical signal and indicating a channel for the second channel setting optical signal; and a control unit configured to control the wavelength variable optical transmitting unit and the wavelength variable optical receiving unit, and the control unit sets, based on the second channel information that the wavelength variable optical receiving unit has transferred, a first channel indicated by the second channel information as a channel through which the wavelength variable optical receiving unit receives an optical signal.

An optical transmission apparatus according to an aspect of the present invention includes: a plurality of optical transceivers; and an optical multiplexing/demultiplexing unit configured to multiplex and output optical signals output from the plurality of optical transceivers, and demultiplex a received optical signal into optical signals for the plurality of optical transceivers according to a channel, in which each of the plurality of optical transceivers includes: a wavelength variable optical transmitting unit configured to be able to transmit a first channel setting optical signal including first channel information indicating a channel for the first channel setting optical signal; a wavelength variable optical receiving unit configured to, when the optical transceiver receives a second channel setting optical signal from another optical transceiver provided in another optical transmission apparatus, transfer second channel information contained in the second channel setting optical signal and indicating a channel for the second channel setting optical signal; and a control unit configured to control the wavelength variable optical transmitting unit and the wavelength variable optical receiving unit, and the control unit sets, based on the second channel information that the wavelength variable optical receiving unit has transferred, a first channel indicated by the second channel information as a channel through which the wavelength variable optical receiving unit receives an optical signal.

A method for setting an optical transceiver according to an aspect of the present invention includes: transmitting a first channel setting optical signal including first channel information indicating a channel for the first channel setting optical signal; transferring, when a second channel setting optical signal is received from another optical transceiver, second channel information contained in the second channel setting optical signal and indicating a channel for the second channel setting optical signal; and setting, based on the second channel information that has been transferred, a first channel indicated by the second channel information as a channel through which an optical signal is received.

A non-transitory computer readable medium storing a program according to an aspect of the present invention causes, in an optical transceiver including a control unit configured as an arithmetic unit capable of controlling a wavelength variable optical transmitting unit and a wavelength variable optical receiving unit, the control unit to perform: a process for transmitting a first channel setting optical signal including first channel information indicating a channel for the first channel setting optical signal from the wavelength variable optical transmitting unit; a process for transferring, when a second channel setting optical signal is received from another optical transceiver, second channel information contained in the second channel setting optical signal and indicating a channel for the second channel setting optical signal by the wavelength variable optical receiving unit; and a process for setting, based on the second channel information that the wavelength variable optical receiving unit has transferred, a first channel indicated by the second channel information as a channel through which the wavelength variable optical receiving unit receives an optical signal.

Advantageous Effects of Invention

According to the present invention, it is possible to enable an optical transceiver to autonomously set a channel(s) through which optical signals are transmitted and received.

EXAMPLE EMBODIMENT

Figure 1:
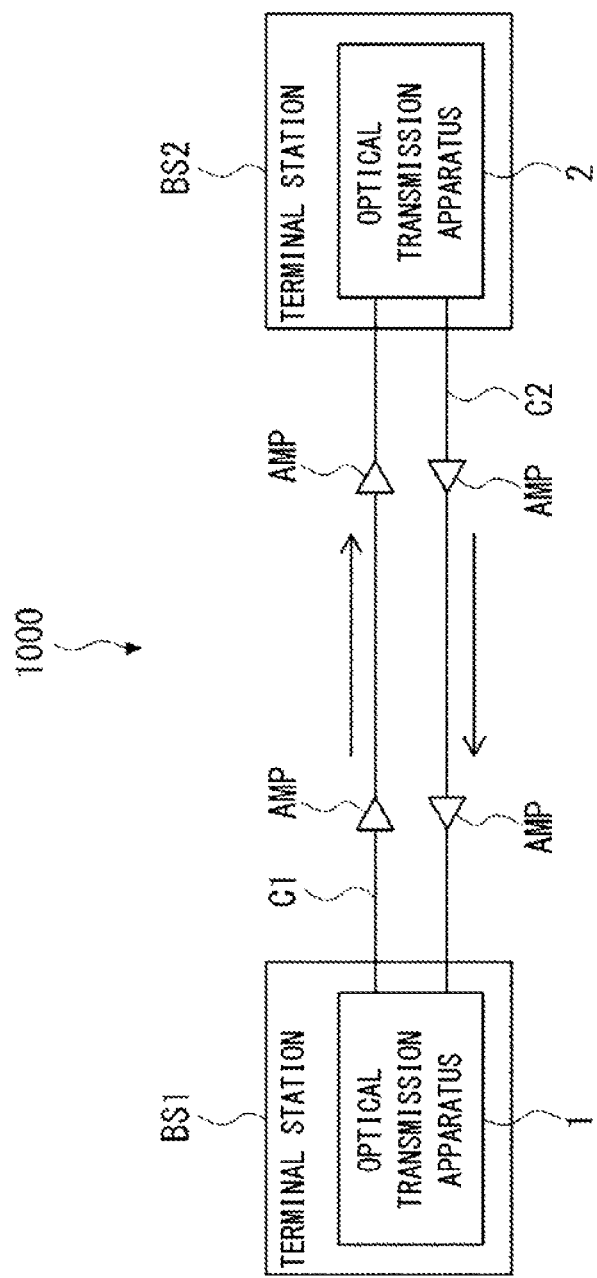
FIG. 1 schematically shows a basic configuration of an optical communication system according to a first example embodiment.

An example embodiment according to the present invention will be described hereinafter with reference to the drawings. The same reference numerals (or symbols) are assigned to the same elements throughout the drawings, and duplicate descriptions thereof are omitted as appropriate.

First Example Embodiment

An optical communication system 1000 according to a first example embodiment will be described. FIG. 1 schematically shows a basic configuration of the optical communication system 1000 according to the first example embodiment. In the optical communication system 1000, optical transmission apparatuses 1 and 2 are provided in terminal stations BS1 and BS2, respectively, which are located on land. The optical transmission apparatuses 1 and 2 are connected to each other through optical cables C1 and C2. The optical cables C1 and C2 may be laid (e.g., buried) on land or on the seabed. In this example, the optical cable C1 is used as a cable through which optical signals are transmitted from the optical transmission apparatus 1 to the optical transmission apparatus 2. The optical cable C2 is used as a cable through which optical signals are transmitted from the optical transmission apparatus 2 to the optical transmission apparatus 1. Note that at least one optical amplifier AMP may be inserted in (i.e., provided in the middle of) each of the optical cables C1 and C2 in order to compensate for attenuation (i.e., losses) of optical signals caused by the transmission thereof.

FIG. 1 shows a configuration of an optical communication system in a simplified manner for the sake of simplicity. For example, one optical transmission apparatus may be connected to two or more optical transmission apparatuses through optical cables so that they can communicate with each other. Further, an optical branching/insertion device for ADD/DROP of an optical signal may be inserted in (i.e., provided in the middle of) the optical cable as required, so that a branch line(s) is branched from the trunk line. However, the above-described features are merely examples. That is, needless to say, the optical communication system may be configured so as to include arbitrary lines (e.g., the trunk line and branch lines) that enable optical communication to be performed between an arbitrary number of optical transmission apparatuses.

The configuration of the optical transmission apparatus will be described. The optical transmission apparatus includes a plurality of optical transceivers, an optical multiplexer that multiplexes optical signals to be transmitted and output the multiplexed optical signal, and an optical demultiplexer that demultiplexes a received multiplexed optical signal into optical signals for the respective optical transceivers. In the following description, for the sake of simplicity, the optical multiplexer and the optical demultiplexer are collectively regarded as one optical multiplexing/demultiplexing unit.

Figure 2:
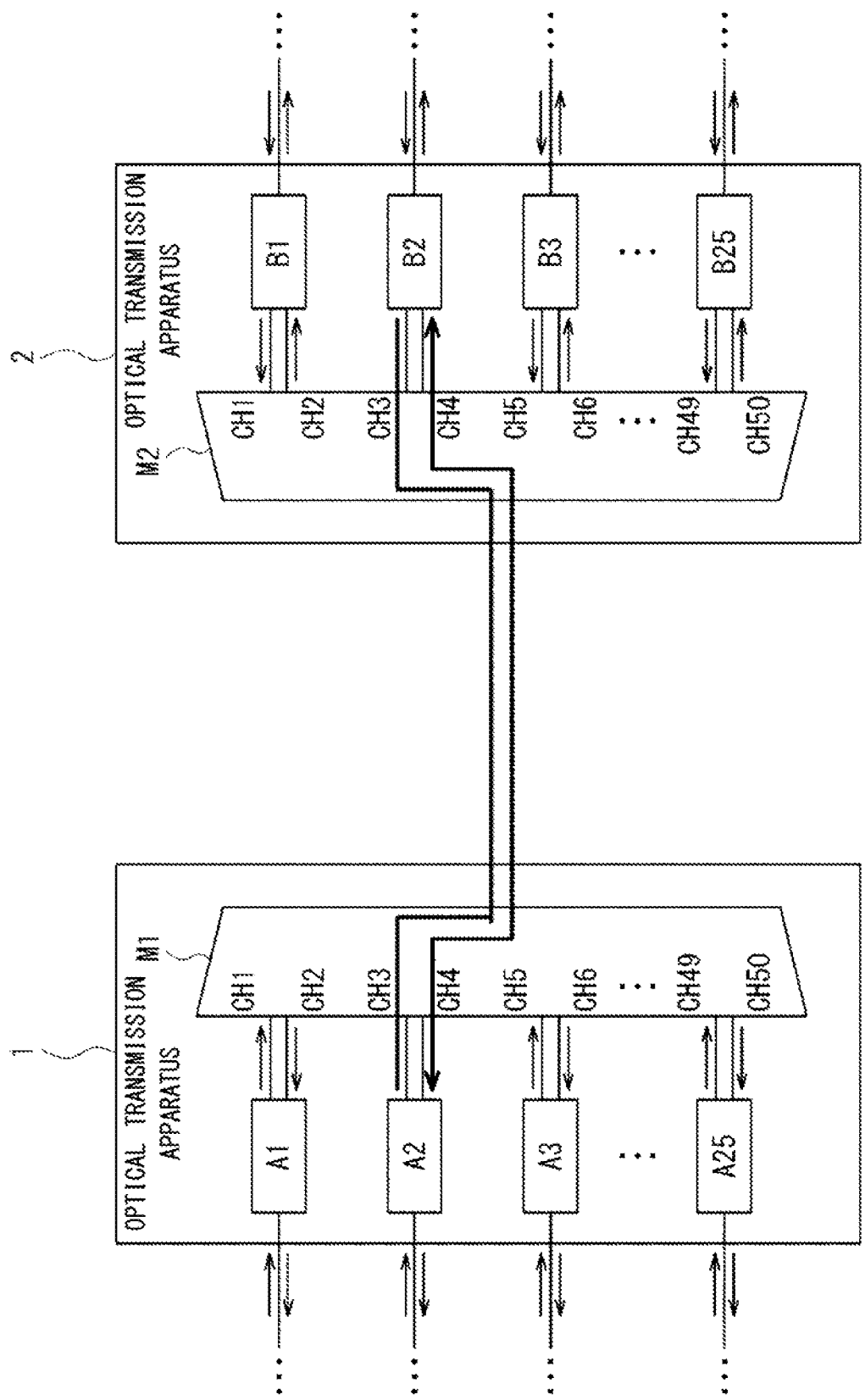
FIG. 2 schematically shows a configuration of an optical transmission apparatus according to the first example embodiment, and an example of transmission and reception of optical signals.

FIG. 2 schematically shows the configuration of the optical transmission apparatuses 1 and 2 according to the first example embodiment, and an example of transmission and reception of optical signals. The optical transmission apparatus 1 includes a plurality of optical transceivers, and an optical multiplexing/demultiplexing unit M1 (which is also referred to as a second optical multiplexing/demultiplexing unit). In this example, the optical transmission apparatus 1 includes 25 optical transceivers A1 to A25. Two different channels are assigned to each of the optical transceivers A1 to A25.

The number of ports that are provided in the optical multiplexing/demultiplexing unit M1 and connected to the optical transceivers is equal to the number of channels. Further, the transmitting port of an optical transceiver Ai (i is an integer no smaller than 1 and no greater than 25) is connected to the port for a channel CH(2i−1) of the optical multiplexing/demultiplexing unit M1, and the receiving port of the optical transceiver Ai is connected to the port for a channel CH(2i) of the optical multiplexing/demultiplexing unit M1. In other words, the transmitting channel CH(2i−1) and the receiving channel CH(2i) are assigned to the optical transceiver Ai. That is, channels CH1 and CH2, CH3 and CH4, CH5 and CH6, . . . , and CH49 and CH50 are assigned to the optical transceivers A1, A2, A3, . . . , and A25, respectively. As described above, specific channels are assigned to the two ports of each of the optical transceivers without any one of the channels being assigned to two or more ports in the optical transmission apparatus.

The optical transmission apparatus 2 has a configuration similar to that of the optical transmission apparatus 1. That is, the optical transmission apparatus 2 includes 25 optical transceivers B1 to B25, and an optical multiplexing/demultiplexing unit M2 (which is also referred to as a first optical multiplexing/demultiplexing unit).

The number of ports that are provided in the optical multiplexing/demultiplexing unit M2 and connected to the optical transceivers is equal to the number of channels. Further, the receiving port of an optical transceiver Bi is connected to the port for a channel CH(2i−1) of the optical multiplexing/demultiplexing unit M2, and the transmitting port of the optical transceiver Bi is connected to the port for a channel CH(2i) of the optical multiplexing/demultiplexing unit M2. In other words, the transmitting channel CH(2i) and the receiving channel CH(2i−1) are assigned to the optical transceiver Bi. That is, channels CH1 and CH2, CH3 and CH4, CH5 and CH6, . . . , and CH49 and CH50 are assigned to the optical transceivers B1, B2, B3, . . . , and B25, respectively. As described above, specific channels are assigned to the two ports of each of the optical transceivers without any one of the channels being assigned to two or more ports in the optical transmission apparatus.

By the above-described configuration, two common channels are assigned to the optical transceiver Ai and to the optical transceiver Bi, so that they can transmit and receive optical signals by using these two channels.

In this example, transmission and reception lines for optical signals are shown by describing only the optical transceiver A2 of the optical transmission apparatus 1 and the optical transceiver B2 of the optical transmission apparatus 2 as just examples of the optical transceivers. The optical transceiver A2 transmits an optical signal by using the channel CH3, and the optical transceiver B2 receives the optical signal transmitted through the channel CH3. Further, the optical transceiver B2 transmits an optical signal by using the channel CH4, and the optical transceiver A2 receives the optical signal transmitted through the channel CH4.

Note that, in FIG. 2, only the optical transceivers A2 and B2 have been described as just examples of the optical transceivers for simplifying the explanation. That is, needless to say, each of the other transceivers can also transmit and receive optical signals by using two channels.

As described above, in order to transmit and receive optical signals through specific channels, it is necessary to set channels used for the optical transceiver on the transmitting side and the optical transceiver on the receiving side. In general, the task for setting channels for optical transceivers is carried out as a part of the initial setting task when the optical transceivers are attached to the optical transmission apparatus.

However, in the case where, for example, up to 50 channels are used as in the case of the above-described optical communication system, it is necessary to perform setting operations for two channels for each of 50 optical transceivers, i.e., to perform setting operations 100 times in total. However, if these setting operations are manually performed, it causes a problem that an enormous amount of working time is required. Further, it is considered that since it is also necessary to perform a large number of setting operations without making any mistake, the manually-performed setting operations also cause a problem in regard to the reliability.

Therefore, in this example embodiment, in order to cope with such problems, optical transceivers that autonomously perform a channel setting process when the optical transceivers are attached to an optical transmission apparatus will be described.

For example, when the optical transceivers A2 and B2 are attached to the optical transmission apparatus, the optical transceivers A2 and B2 autonomously perform a channel setting process. In this process, a channel setting optical signal(s) is transmitted and received between the optical transceivers A2 and B2.

Figure 3:
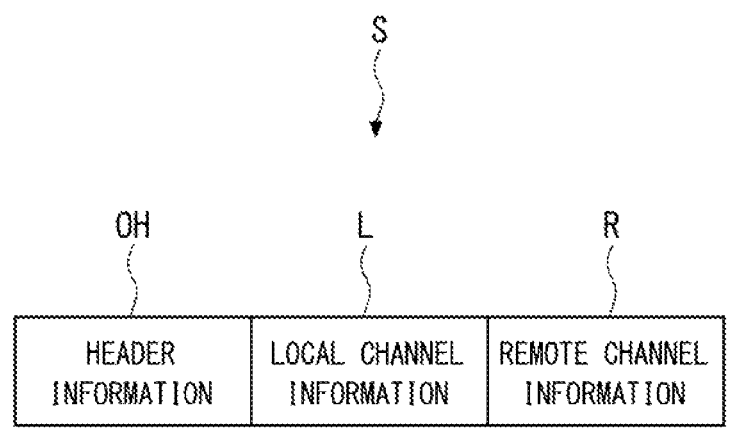
FIG. 3 schematically shows a structure of a channel setting optical signal.

FIG. 3 schematically shows the structure (e.g., the format) of the channel setting optical signal. A channel setting optical signal S contains at least local channel information L and remote channel information R which are originally held in the optical transceiver. The local channel information L is information indicating, when the optical transceiver transmits the channel setting optical signal S in the channel setting process, the channel for the transmitted channel setting optical signal S. The remote channel information R is information indicating, when the optical transceiver receives the channel setting optical signal S in the channel setting process, the channel for the received channel setting optical signal S. Note that the channel setting optical signal S may contain other information as required. FIG. 3 shows an example in which the channel setting optical signal S contains header information OH.

Figure 4:
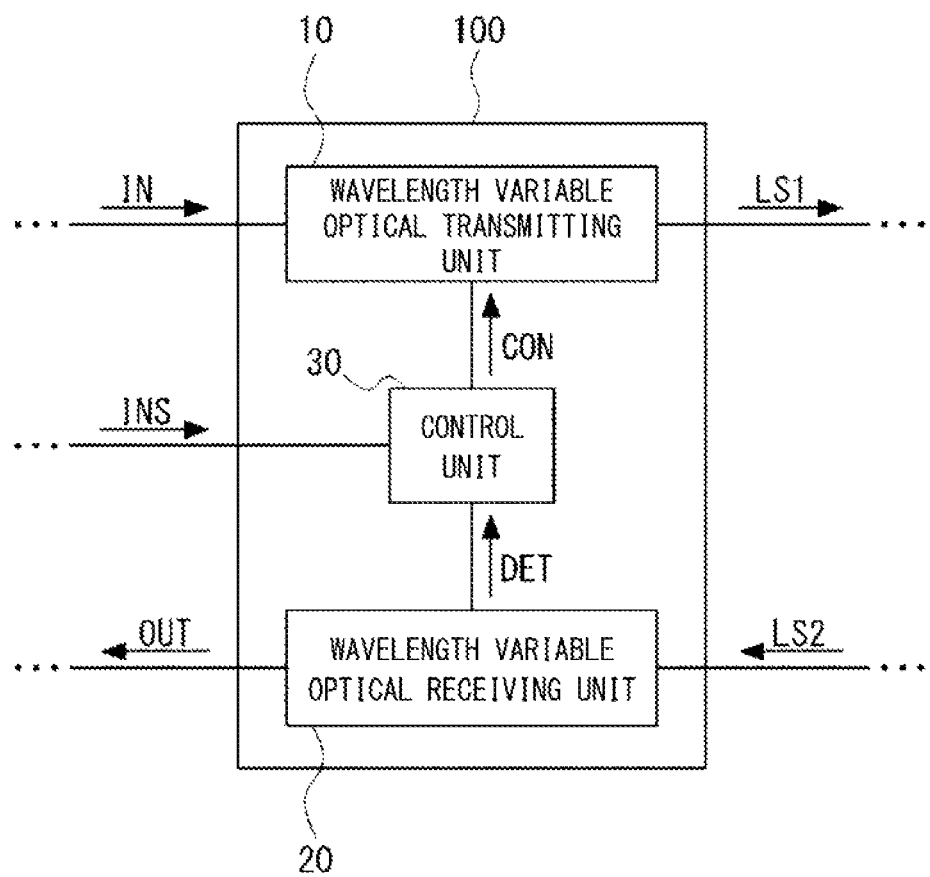
FIG. 4 schematically shows a basic configuration of an optical transceiver according to the first example embodiment.
Figure 5:
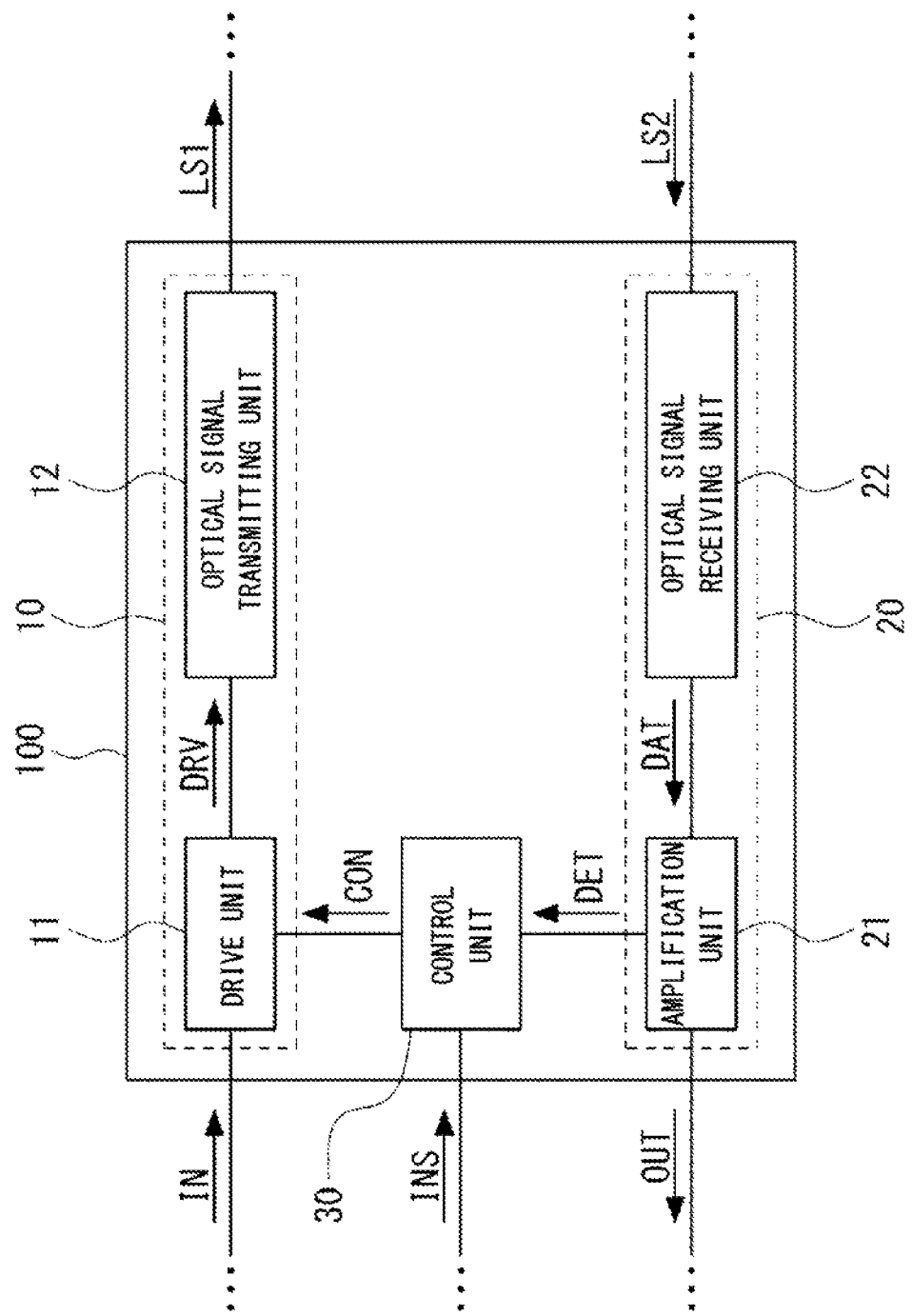
FIG. 5 shows the configuration of the optical transceiver according to the first example embodiment in a more detailed manner.

The configuration of the optical transceiver according to this example embodiment will be described hereinafter. FIG. 4 schematically shows a basic configuration of the optical transceiver according to the first example embodiment. FIG. 5 shows the configuration of the optical transceiver according to the first example embodiment in a more detailed manner. Note that since the optical transceivers A1-A25 and B1-B25 have configurations similar to each other, an optical transceiver 100 having the same configuration as those of these optical transceivers will be described as a representative example of them.

The optical transceiver 100 includes a wavelength variable optical transmitting unit 10, a wavelength variable optical receiving unit 20, and a control unit 30. For example, the control unit 30 controls operations performed by the wavelength variable optical transmitting unit 10 and the wavelength variable optical receiving unit 20 according to a command signal INS provided from the optical transmission apparatus in which the optical transceiver 100 is provided.

The wavelength variable optical transmitting unit 10 is configured to be able to change the wavelength of an optical signal to be transmitted, i.e., the channel for the optical signal. The wavelength variable optical transmitting unit 10 includes a drive unit 11 and an optical signal transmitting unit 12. The drive unit 11 outputs a drive signal DRV to the optical signal transmitting unit 12 based on a received main signal (data signal) IN. The wavelength variable optical signal transmitting unit 12 is configured as, for example, a TOSA (Transmitter Optical Sub-Assembly), and is configured to be able to output an optical signal LS1 which has been modulated according to the drive signal DRV.

The wavelength variable optical receiving unit 20 is configured to be able to change the wavelength of an optical signal to be received, i.e., the channel for the optical signal. The wavelength variable optical receiving unit 20 includes an amplification unit 21 and an optical signal receiving unit 22. The wavelength variable optical signal receiving unit 22, which is configured as, for example, a ROSA (Receiver Optical Sub-Assembly), converts a received optical signal LS2 into an output signal DAT, which is an electric signal, and outputs the output signal DAT to the amplification unit 21. The amplification unit 21, which is configured as, for example, a limiting amplifier, amplifies the amplitude of the output signal DAT to a predetermined amplitude, and outputs the amplified output signal OUT to the outside of the optical transceiver 100, for example, to the optical transmission apparatus in which the optical transceiver 100 is provided.

Figure 6:
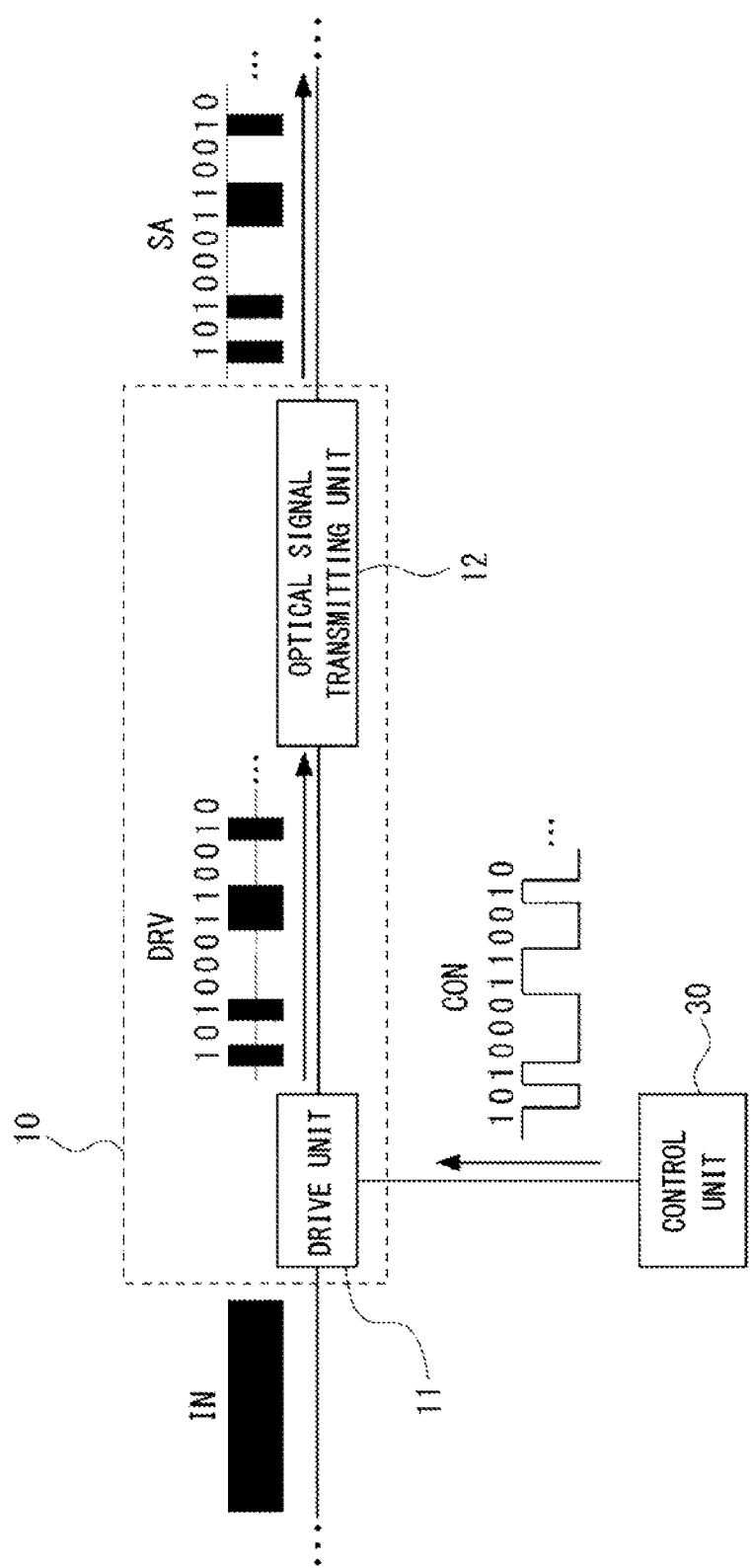
FIG. 6 shows transmission of a channel setting optical signal in the optical transceiver according to the first example embodiment.

Next, the transmission of a channel setting optical signal by the optical transceiver 100 will be described. FIG. 6 shows the transmission of a channel setting optical signal SA by the optical transceiver 100. The control unit 30 provides a control signal CON to the drive unit 11, and thereby superimposes a low-rate (low-frequency) signal onto the drive signal DRV output from the drive unit 11. For example, by connecting a serial port of the control unit 30 to an output amplitude Disable terminal of the drive unit 11 and thereby outputting the control signal CON to the output amplitude Disable terminal, it is possible to on/off-modulate the drive signal DRV, i.e., to set the amplitude thereof to 0 or 1. The optical signal transmitting unit 12 can output, according to the drive signal DRV, which has been low-rate-modulated in order to transmit the channel setting optical signal SA, the on/off-modulated channel setting optical signal SA. In this process, by incorporating local channel information L and remote channel information R into the control signal CON, the channel setting optical signal SA output from the optical signal transmitting unit 12 contains the local channel information L and the remote channel information R.

Figure 7:
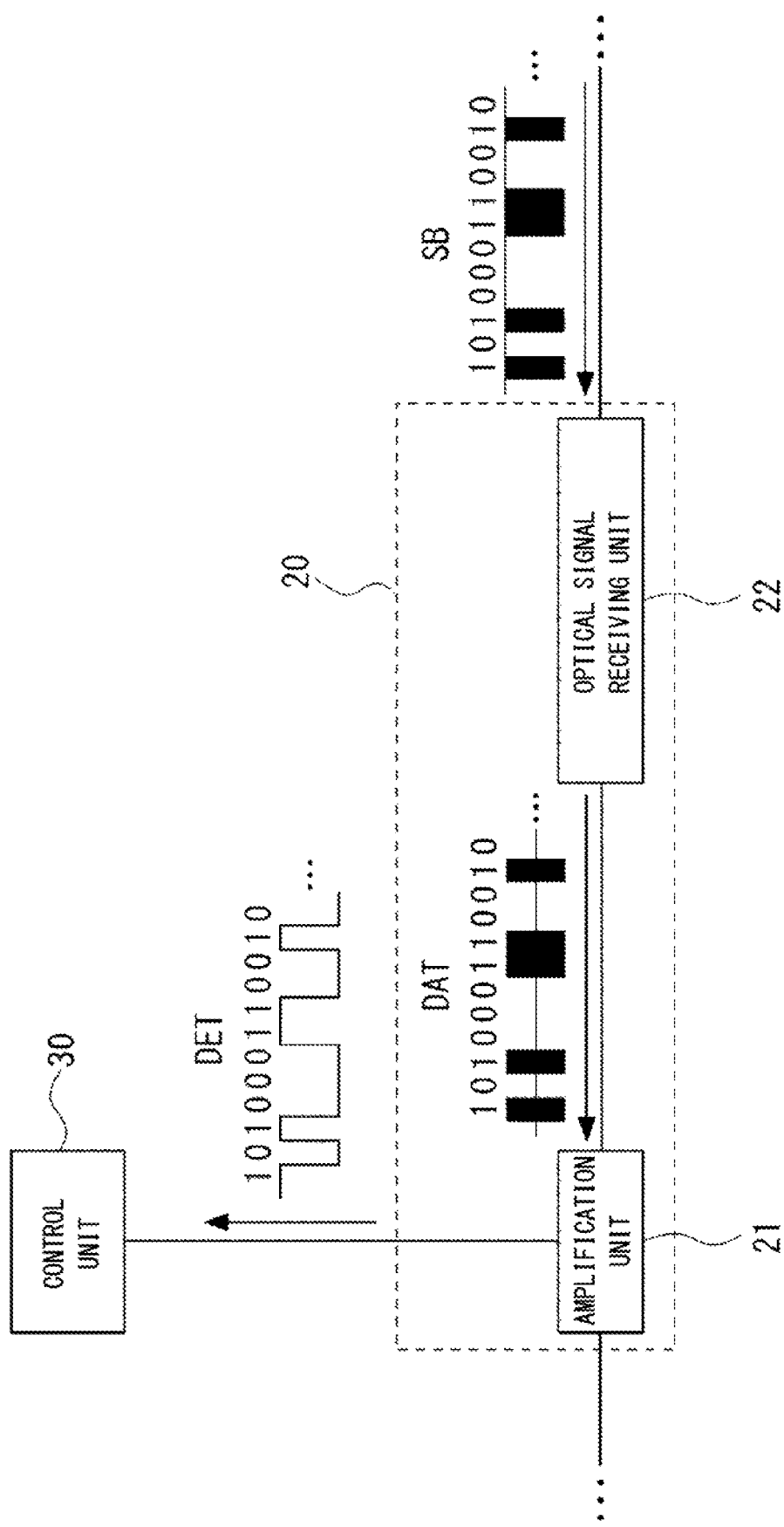
FIG. 7 shows reception of a channel setting optical signal in the optical transceiver according to the first example embodiment.

Next, the reception of a channel setting optical signal by the optical transceiver 100 will be described. FIG. 7 shows the reception of a channel setting optical signal SB by the optical transceiver 100. When the optical signal receiving unit 22 receives the channel setting optical signal SB, which has been generated as described above, the amplitude of the output signal DAT rises and falls (i.e., increases and decreases) according to the amplitude of the on/off-modulated channel setting optical signal SB. The amplification unit 21 detects the amplitude of the output signal DAT and outputs a detection signal DET indicating the result of the detection to the control unit 30. In this way, the control unit 30 can receive the local channel information L and the remote channel information R irrespective of the channel for the channel setting optical signal SB just by monitoring the amplitude of the channel setting optical signal SB.

Figure 8:
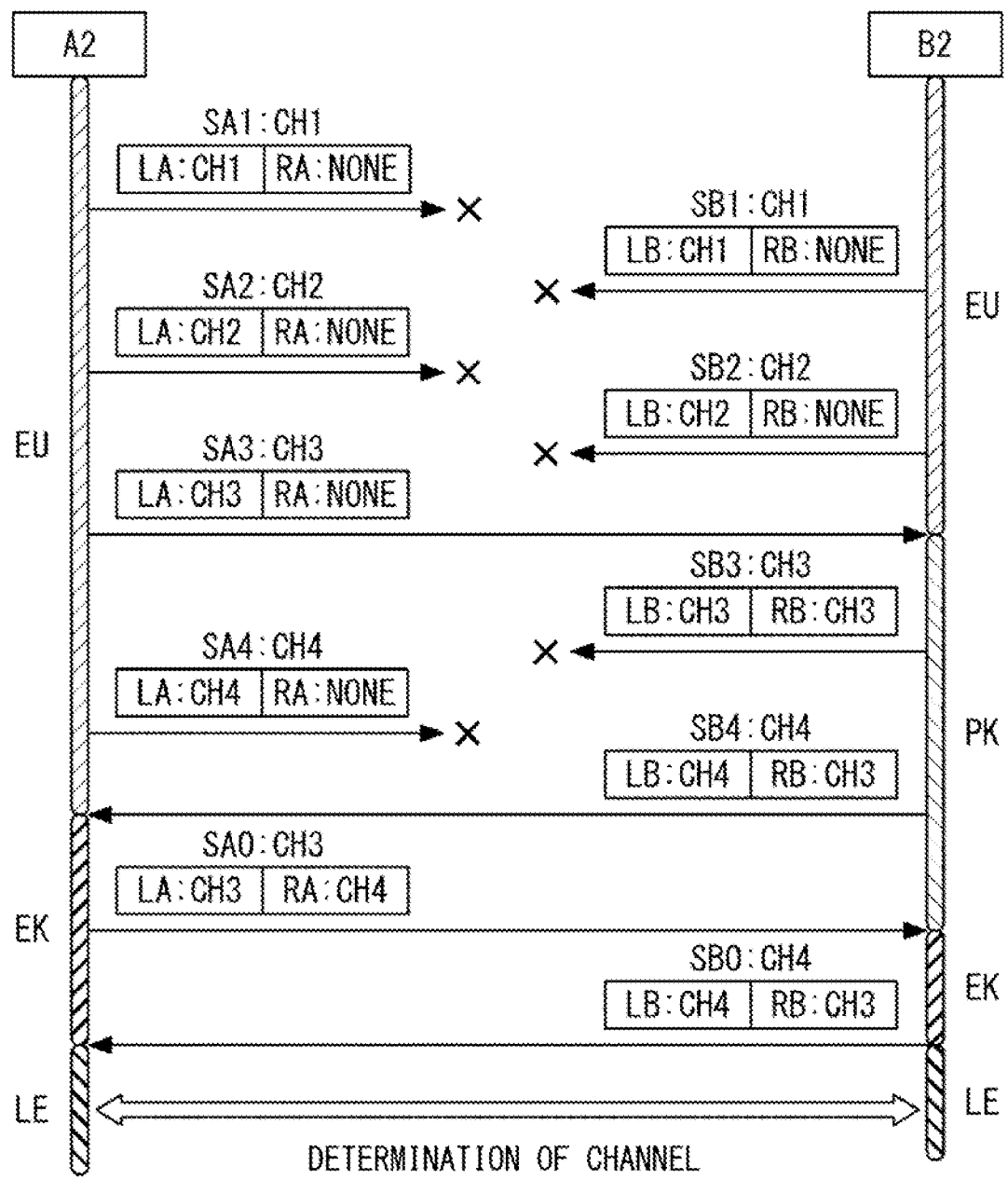
FIG. 8 shows an example of channel setting optical signals transmitted and received between two transceivers in a channel setting process.
Figure 9:
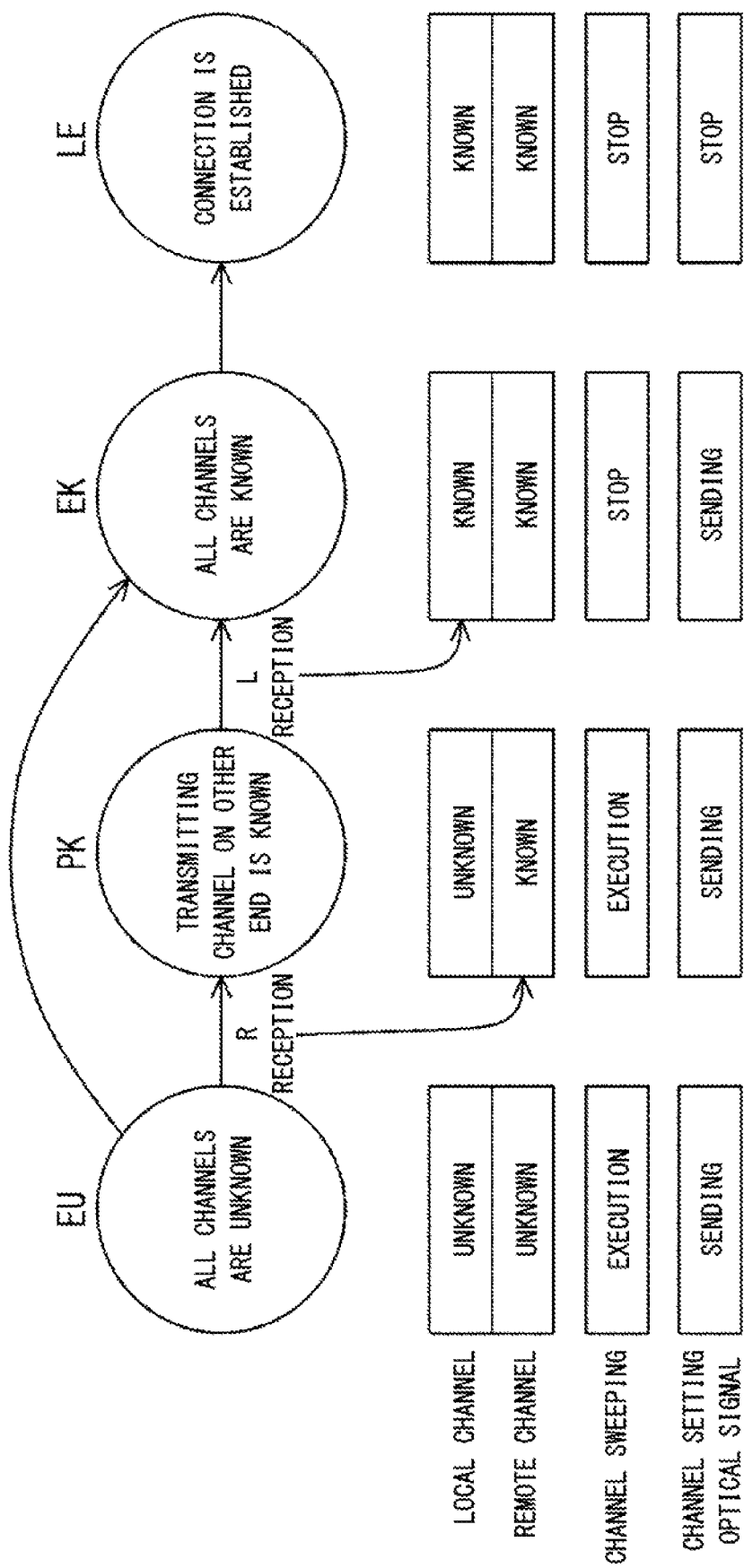
FIG. 9 shows state transitions in the channel setting process.

Next, a channel setting process that the optical transceiver performs by using the above-described channel setting optical signal will be described. The optical transceivers A2 and B2 determine, by transmitting a channel setting optical signal while changing the local channel information L, i.e., while sweeping (i.e., successively changing) local channels, the channel that is used to transmit and receive optical signals between them through the below-shown procedure. FIG. 8 shows an example of channel setting optical signals transmitted and received between the optical transceivers A2 and B2 in the channel setting process. FIG. 9 shows state transitions in the channel setting process.

At the time when the channel setting process is started, the optical transceivers A2 and B2 are in a state in which the transmitting channel and the receiving channel to be set are unknown (hereinafter also referred to as a State EU: Each channel Unknown). That is, neither the optical transceiver to which an optical signal will be transmitted nor the optical transceiver which will transmit the optical signal to be received is not specified.

After that, the optical transceivers A2 and B2 repeatedly transmit the channel setting optical signal while sweeping (i.e., successively changing) local channels. In this example, it is assumed that the local channels are swept (i.e., successively changed) in ascending order of the channel number, starting from the channel CH1.

Note that, in the following description, the optical transceiver B2 is also referred to as a first optical transceiver and the optical transceiver A2 is also referred to as a second optical transceiver. The channel setting optical signal output from the optical transceiver B2 is also referred to as the first channel setting optical signal. The channel setting optical signal output from the optical transceiver A2 is also referred to as the second channel setting optical signal.

The channel CH3 is also referred to as a first channel, and the channel CH4 is also referred to as a second channel.

The local channel information LB of the optical transceiver B2 is also referred to as first channel information, and the local channel information LA of the optical transceiver A2 is also referred to as second channel information. The remote channel information RB of the optical transceiver B2 is also referred to as third channel information, and the local channel information LA of the optical transceiver A2 is also referred to as second channel information.

(1) SA1/LA: CH1, RA: NONE

In the example shown in FIG. 8, the optical transceiver A2 first transmits a channel setting optical signal SA1 for the channel CH1 in which the local channel information LA is the channel CH1 and the remote channel information RA is empty (NONE). In this example, the channel CH1 is the channel used for the transmission from the optical transceiver A1 to the optical transceiver B1. That is, the receiving port of the optical transceiver B1 is connected to the port for the channel CH1 of the optical multiplexing/demultiplexing unit M2 of the optical transmission apparatus 2. Therefore, the channel setting optical signal SA1 is blocked by the optical multiplexing/demultiplexing unit M2 and hence does not reach the optical transceiver B2.

(2) SB1/LB: CH1, RB: NONE

Next, the optical transceiver B2 transmits a channel setting optical signal SB1 for the channel CH1 in which the local channel information LB is the channel CH1 and the remote channel information RB is empty (NONE). Since the transmitting port of the optical transceiver A1 is connected to the port for the channel CH1 of the optical multiplexing/demultiplexing unit M1 of the optical transmission apparatus 1, the channel setting optical signal SB1 is blocked by the optical multiplexing/demultiplexing unit M1 and hence does not reach the optical transceiver A2.

(3) SA2/LA: CH2, RA: NONE

Next, the optical transceiver A2 transmits a channel setting optical signal SA2 for the channel CH2 in which the local channel information LA is the channel CH2 and the remote channel information RA is empty (NONE). In this example, the channel CH2 is the channel used for the transmission from the optical transceiver B1 to the optical transceiver A1. That is, the transmitting port of the optical transceiver B1 is connected to the port for the channel CH2 of the optical multiplexing/demultiplexing unit M2 of the optical transmission apparatus 2. Therefore, the channel setting optical signal SA2 is blocked by the optical multiplexing/demultiplexing unit M2 and hence does not reach the optical transceiver B2.

(4) SB2/LA: CH2, RA: NONE

Next, the optical transceiver B2 transmits a channel setting optical signal SB2 for the channel CH2 in which the local channel information LB is the channel CH2 and the remote channel information RB is empty (NONE). Since the receiving port of the optical transceiver A1 is connected to the port for the channel CH2 of the optical multiplexing/demultiplexing unit M1 of the optical transmission apparatus 1, the channel setting optical signal SB2 is blocked by the optical multiplexing/demultiplexing unit M1 and hence does not reach the optical transceiver A2.

(5) SA3/LA: CH3, RA: NONE, State Transition: EU→PK

Next, the optical transceiver A2 transmits a channel setting optical signal SA3 for the channel CH3 in which the local channel information L is the channel CH3 and the remote channel information R is empty (NONE). In this example, the channel CH3 is the channel used for the transmission from the optical transceiver A2 to the optical transceiver B2. That is, the receiving port of the optical transceiver B2 is connected to the port for the channel CH3 of the optical multiplexing/demultiplexing unit M2 of the optical transmission apparatus 2. Therefore, the channel setting optical signal SA3 for the channel CH3 is received by the optical transceiver B2 through the optical multiplexing/demultiplexing unit M2.

Therefore, the optical transceiver B2 can receive the channel CH3 as the local channel information LA of the optical transceiver A2. Since the local channel information LA of the optical transceiver A2 is the remote channel information RB for the optical transceiver B2, the optical transceiver B2 fixes the remote channel information RB to the channel CH3.

In this state, the optical transceiver B2 enters a state in which the transmitting channel of the optical transceiver A on the other end has been detected (i.e., a state PK: Partner CH Known), and hence its state changes from the state EU to the state PK.

(6) SB4/LB: CH3, RB: NONE

Next, the optical transceiver B2 transmits a channel setting optical signal SB3 for the channel CH3 in which the local channel information LB is the channel CH3 and the remote channel information RB is the channel CH3. Since the transmitting port of the optical transceiver A2 is connected to the port for the channel CH3 of the optical multiplexing/demultiplexing unit M1 of the optical transmission apparatus 1, the channel setting optical signal SB3 for the channel CH3 is blocked by the optical multiplexing/demultiplexing unit M1 and hence does not reach the optical transceiver A2.

(7) SA4/LA: CH4, RA: NONE

Next, the optical transceiver A2 transmits a channel setting optical signal SA4 for the channel CH4 in which the local channel information LA is the channel CH4 and the remote channel information RA is empty (NONE). In this example, the channel CH4 is the channel used for the transmission from the optical transceiver B2 to the optical transceiver A2. That is, the transmitting port of the optical transceiver B2 is connected to the port for the channel CH4 of the optical multiplexing/demultiplexing unit M2 of the optical transmission apparatus 2. Therefore, the channel setting optical signal SA4 for the channel CH4 is blocked by the optical multiplexing/demultiplexing unit M2 and hence does not reach the optical transceiver B2.

(8) SB4/LB: CH4, RA: CH3, State Transition: EU→EK

Next, the optical transceiver B2 transmits a channel setting optical signal SB4 for the channel CH4 in which the local channel information LB is the channel CH4 and the remote channel information RB is the channel CH3. The receiving port of the optical transceiver B2 is connected to the port for the channel CH4 of the optical multiplexing/demultiplexing unit M1 of the optical transmission apparatus 1. Therefore, the channel setting optical signal SB4 for the channel CH4 is received by the optical transceiver A2 through the optical multiplexing/demultiplexing unit M1.

In this way, the optical transceiver A2 can receive the channel CH4 as the local channel information LB of the optical transceiver B2. Since the local channel information LB of the optical transceiver B2 is the remote channel information RA for the optical transceiver A2, the optical transceiver A2 fixes the remote channel information RA to the channel CH4.

Further, the optical transceiver A2 can receive the channel CH3 as the remote channel information RB of the optical transceiver B2. Since the remote channel information RB of the optical transceiver B2 is the local channel information LA for the optical transceiver A2, the optical transceiver A2 fixes the local channel information LA to the channel CH3. Note that the fact that the local channel information LA has been fixed to the channel CH3 means that the transmitting channel of the optical transceiver A2 has been set, so that the optical transceiver A2 stops the channel sweeping.

In this state, the optical transceiver A2 enters a state in which the transmitting channel of the optical transceiver B2 on the other end and the channel through which optical signals can be transmitted from the optical transceiver A2 to the optical transceiver B2 have been detected (i.e., a state EK: Each CH Known), and hence the state changes from the state EU to the state EK.

(9) SA0/LA: CH3, RA: CH4, State Transition: PK→EK

Next, the optical transceiver A2 transmits a channel setting optical signal SA0 for the channel CH3 in which the local channel information LA is the channel CH3 and the remote channel information RA is fixed to the channel CH4. The channel setting optical signal SA0 for the channel CH3 is received by the optical transceiver B2.

In this case, the optical transceiver B2 can receive the channel CH4 as the remote channel information RA of the optical transceiver A2. Since the remote channel information RA of the optical transceiver A2 is the local channel information LB for the optical transceiver B2, the optical transceiver B2 fixes the local channel information LB to the channel CH4. Note that the fact that the local channel information LB has been fixed to the channel CH4 means that the transmitting channel of the optical transceiver B2 has been set, so that the optical transceiver B2 stops the channel sweeping.

In this state, the optical transceiver B2 enters a state in which the transmitting channel of the optical transceiver A2 on the other end and the channel through which optical signals can be transmitted from the optical transceiver B2 to the optical transceiver A2 have been detected (i.e., a state EK), and hence the state changes from the state PK to the state EK.

(10) SB0/LB: CH4, RB: CH3, State Transition: EK→LE

Next, the optical transceiver B2 transmits a channel setting optical signal SB0 for the channel CH4 in which the local channel information LB is the channel CH4 and the remote channel information RB is fixed to the channel CH3. The channel setting optical signal SB0 for the channel CH4 is received by the optical transceiver A2.

In this case, the optical transceivers A2 and B2 can confirm that the local channel information LA of the optical transceiver A2 and the remote channel information RB of the optical transceiver B2 coincide with each other, and both of them indicate the channel CH3, and that the local channel information LB of the optical transceiver B2 and the remote channel information RA of the optical transceiver A2 coincide with each other, and both of them indicate the channel CH4. Therefore, in this case, the optical transceivers A2 and B2 can confirm that the channel used for the transmission and the channel used for the reception are determined. Therefore, since there is no need to continue the channel setting process, the optical transceivers A2 and B2 finish the channel setting process while presuming that the connection therebetween has been established (a state LE: Link Established).

Therefore, after the completion of the channel setting process, the optical transceivers A2 and B2 can transmit and receive optical signals by using the channels CH3 and CH4.

As described above, according to the above-described configuration, the optical transceivers can autonomously set the channel for optical signals to be transmitted and the channel for optical signals to be received by referring to information contained in the received channel setting signal.

As a result, the time required to set channels for optical transceivers can be reduced even when, for example, a larger number of channels are used as in the case of the above-described optical communication system.

It is conceivable that, in the manually-performed channel setting operations, it takes time on the order of minutes, e.g., about ten minutes, for the setting operation for one channel. In contrast to this, according to the above-described configuration, the automatic setting for one channel can be completed on the order of seconds, e.g., in several seconds, though the required time may vary depending on the configuration of the optical communication system. As described above, it can be understood that, according to the above-described configuration, it is possible to significantly reduce the time required to set channels for optical transceivers.

Further, since the optical transceiver autonomously performs channel setting, it is possible to not only reduce the amount of manual work performed by an operator(s), but also to enable the operator(s) to do other work during the channel setting process. Therefore, it is also advantageous for the labor savings for the operations.

Further, since the optical transceiver can autonomously perform channel setting, it is possible to prevent mistakes such as a mistake in which incorrect channels are set, which would otherwise occur due to the manually-performed channel setting operations, and thereby to improve the reliability of the channel setting.

Note that the following situation is conceivable. That is, transceivers fewer than the maximum number of transceivers that can be disposed in an optical transmission apparatus are initially provided in the optical transmission apparatus when it is operated for the first time, and after that, additional optical transceivers are provided in the optical transmission apparatus. In such a case, if the channels are manually set, it is necessary to perform complicated tasks such as examining the already-used channels and then setting channels different from those already-used channels. In contrast to this, according to the optical transceiver in accordance with this example embodiment, even if the already-used channels are not known, channels can be autonomously set. Therefore, it is also advantageous for reducing the time required for the work, and for the labor savings when additional optical transceivers are provided.

The above description has been given by using only the optical transceivers A2 and B2 as just examples of optical transceivers. However, needless to say, channel setting processes can be performed for the other transceivers A1, A3-A25, B1, and B3-B25 in a similar manner.

Note that although the above description has been given on the assumption that the optical transceiver changes the channel for the channel setting optical signal in ascending order of the channel number, starting from the channel CH1, this method is merely an example. For example, the optical transceiver may change the channel for the channel setting optical signal in descending order of the channel number. Further, for example, the optical transceiver may change the channel for the channel setting optical signal in an arbitrary order other than the descending order and the ascending order.

Other Example Embodiment

Note that the present invention is not limited to the above-described example embodiments, and they may be modified as appropriate without departing from the scope and spirit of the invention. For example, the optical transmission apparatus may be connected not only to the network shown in FIG. 1 but also to various networks including trunk lines and branch lines.

The number of transceivers provided in the optical transmission apparatus and the number of channels used therein are merely examples, and any number of transceivers may be provided and any number of channels may be used.

The above-described example embodiments have been described on the assumption that wavelength-multiplex signals are transmitted between optical transmission apparatuses. However, needless to say, various multiplexing methods other than the wavelength multiplexing can be applied for optical signals to be transmitted and various modulation methods can also be applied for the optical signals.

The above-described configuration of the optical transceiver is a simplified configuration in order to explain the optical transceiver according to the above example embodiment, and needless to say, various components such as a CDR (Clock Data Recovery) unit may be included in the optical transceiver.

Although an example in which an on/off-modulated optical signal is used as the channel setting optical signal has been described in the above description, an optical signal which has undergone a phase shift modulation other than the on/off-modulation may be used as the channel setting optical signal.

Although the present invention is described as a hardware configuration in the above-described example embodiments, the present invention is not limited to the hardware configurations. In the present invention, the control of the wavelength variable optical transmitting unit and the wavelength variable optical receiving unit by the control unit, and the channel setting process shown in FIGS. 8 and 9 can also be implemented by having a CPU (Central Processing Unit) execute a computer program. Further, the aforementioned program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Although the present invention has been described above, the present invention can also be described as, but not limited to, the following supplementary notes.

(Supplementary Note 1)

An optical transceiver comprising:
    a wavelength variable optical transmitting unit configured to be able to transmit a first channel setting optical signal including first channel information indicating a channel for the first channel setting optical signal;
    a wavelength variable optical receiving unit configured to, when the optical transceiver receives a second channel setting optical signal from another optical transceiver, transfer second channel information contained in the second channel setting optical signal and indicating a channel for the second channel setting optical signal; and
    a control unit configured to control the wavelength variable optical transmitting unit and the wavelength variable optical receiving unit, wherein
    the control unit sets, based on the second channel information that the wavelength variable optical receiving unit has transferred, a first channel indicated by the second channel information as a channel through which the wavelength variable optical receiving unit receives an optical signal.

(Supplementary Note 2)

The optical transceiver described in Supplementary note 1, wherein the control unit controls the wavelength variable optical transmitting unit so that the first channel information and the third channel information indicating the first channel are contained in the first channel setting optical signal.

(Supplementary Note 3)

The optical transceiver described in Supplementary note 2, wherein when the second channel information and fourth channel information are contained in the second channel setting optical signal, the wavelength variable optical receiving unit transfers the fourth channel information, the fourth channel information being information indicating the second channel based on the third channel information indicating the second channel different from the first channel, contained in the first channel setting optical signal in which the other optical transceiver is included, and the control unit sets, based on the fourth channel information that the wavelength variable optical receiving unit has transferred, the second channel as a channel through which the wavelength variable optical transmitting unit transmits an optical signal.

(Supplementary Note 4)

The optical transceiver described in Supplementary note 3, wherein the control unit controls the wavelength variable optical transmitting unit so as to stop the transmission of the first channel setting optical signal.

(Supplementary Note 5)

The optical transceiver described in any one of Supplementary notes 1 to 4, wherein in a state in which the second channel setting optical signal is not being received, the control unit changes the channel for the first channel setting optical signal to a channel that has not yet been set as the channel for the first channel setting optical signal, and then outputs the first channel setting optical signal.

(Supplementary Note 6)

The optical transceiver described in any one of Supplementary notes 1 to 5, wherein the first and second channel setting optical signals are on/off-modulated optical signals.

(Supplementary Note 7)

The optical transceiver described in Supplementary note 6, wherein the wavelength variable optical transmitting unit comprises: a drive unit configured to output a drive signal according to an input signal; and a wavelength variable optical output unit configured to output an optical signal modulated according to the drive signal, and the control unit controls the drive unit so that the first channel setting optical signal, which has been on/off-modulated according to the drive signal, is output from the wavelength variable optical output unit.

(Supplementary Note 8)

An optical communication system comprising:

a first optical transmission apparatus comprising; a plurality of optical transceivers including a first optical transceiver; and a first optical multiplexing/demultiplexing unit configured to multiplex and output optical signals output from the plurality of optical transceivers, and demultiplex a received optical signal into optical signals for the plurality of optical transceivers according to a channel;

a second optical transmission apparatus comprising: a plurality of optical transceivers including a second optical transceiver; and a second optical multiplexing/demultiplexing unit configured to multiplex and output optical signals output from the plurality of optical transceivers, and demultiplex a received optical signal into optical signals for the plurality of optical transceivers according to the channel; and an optical cable connecting the first and second optical transmission apparatuses with each other, wherein the first optical transceiver comprises:

a wavelength variable optical transmitting unit configured to be able to transmit a first channel setting optical signal including first channel information indicating a channel for the first channel setting optical signal;

a wavelength variable optical receiving unit configured to, when the first optical transceiver receives a second channel setting optical signal from the second optical transceiver, transfer second channel information contained in the second channel setting optical signal and indicating a channel for the second channel setting optical signal; and a control unit configured to control the wavelength variable optical transmitting unit and the wavelength variable optical receiving unit, and the control unit sets, based on the second channel information that the wavelength variable optical receiving unit has transferred, a first channel indicated by the second channel information as a channel through which the wavelength variable optical receiving unit receives an optical signal.

(Supplementary Note 9)

An optical transmission apparatus comprising:

a plurality of optical transceivers; and an optical multiplexing/demultiplexing unit configured to multiplex and output optical signals output from the plurality of optical transceivers, and demultiplex a received optical signal into optical signals for the plurality of optical transceivers according to a channel, wherein each of the plurality of optical transceivers comprises:

a wavelength variable optical transmitting unit configured to be able to transmit a first channel setting optical signal including first channel information indicating a channel for the first channel setting optical signal;

a wavelength variable optical receiving unit configured to, when the optical transceiver receives a second channel setting optical signal from another optical transceiver provided in another optical transmission apparatus, transfer second channel information contained in the second channel setting optical signal and indicating a channel for the second channel setting optical signal; and a control unit configured to control the wavelength variable optical transmitting unit and the wavelength variable optical receiving unit, and the control unit sets, based on the second channel information that the wavelength variable optical receiving unit has transferred, a first channel indicated by the second channel information as a channel through which the wavelength variable optical receiving unit receives an optical signal.

(Supplementary Note 10)

A method for setting an optical transceiver, comprising:

transmitting a first channel setting optical signal including first channel information indicating a channel for the first channel setting optical signal;

transferring, when a second channel setting optical signal is received from another optical transceiver, second channel information contained in the second channel setting optical signal and indicating a channel for the second channel setting optical signal; and setting, based on the second channel information that has been transferred, a first channel indicated by the second channel information as a channel through which an optical signal is received.

(Supplementary Note 11)

A non-transitory computer readable medium storing a program for causing, in an optical transceiver comprising a control unit configured as an arithmetic unit capable of controlling a wavelength variable optical transmitting unit and a wavelength variable optical receiving unit, the control unit to perform:

- a process for transmitting a first channel setting optical signal including first channel information indicating a channel for the first channel setting optical signal from the wavelength variable optical transmitting unit;
- a process for transferring, when a second channel setting optical signal is received from another optical transceiver, second channel information contained in the second channel setting optical signal and indicating a channel for the second channel setting optical signal by the wavelength variable optical receiving unit; and
- a process for setting, based on the second channel information that the wavelength variable optical receiving unit has transferred, a first channel indicated by the second channel information as a channel through which the wavelength variable optical receiving unit receives an optical signal.

Although the present disclosure is explained above with reference to example embodiments, the present disclosure is not limited to the above-described example embodiments.

Various modifications that can be understood by those skilled in the art can be made to the configuration and details of the present invention within the scope of the invention.

REFERENCE SIGNS LIST 1, 2 OPTICAL TRANSMISSION APPARATUS
10 WAVELENGTH VARIABLE OPTICAL TRANSMITTING UNIT
11 DRIVE UNIT
12 OPTICAL SIGNAL TRANSMITTING UNIT
20 WAVELENGTH VARIABLE OPTICAL RECEIVING UNIT
21 AMPLIFICATION UNIT
22 OPTICAL SIGNAL RECEIVING UNIT
30 CONTROL UNIT
100, A1-A25, B1-B25 OPTICAL TRANSCEIVER
1000 OPTICAL COMMUNICATION SYSTEM
AMP OPTICAL AMPLIFIER
BS1, BS2 TERMINAL STATION
C1, C2 OPTICAL CABLE
CON CONTROL SIGNAL
DAT OUTPUT SIGNAL
DET DETECTION SIGNAL
DRV DRIVE SIGNAL
IN MAIN SIGNAL
INS COMMAND SIGNAL
L, LA, LB LOCAL CHANNEL INFORMATION
LS1, LS2 OPTICAL SIGNAL
M1, M2 OPTICAL MULTIPLEXING/DEMULTIPLEXING UNIT
OH HEADER INFORMATION
OUT OUTPUT SIGNAL
R, RA, RB REMOTE CHANNEL INFORMATION
S, SA, SA0-SA4, SB, SB0-SB4 CHANNEL SETTING OPTICAL SIGNAL

What is claimed is:

1. An optical transceiver comprising:
   an optical transmitter; and
   an optical receiver,
   wherein the optical transceiver is configured to autonomously start a channel setting process in a case where the optical transceiver is attached to an optical transmission apparatus,
   wherein the optical transmitter is configured to, in the channel setting process, transmit a first output optical signal including a first output channel information indicating a channel of the first output optical signal,
   wherein the optical receiver is configured to, in the channel setting process, receive a first input optical signal including a first input channel information indicating a channel of the first input optical signal; and
   wherein the optical transmitter is configured to, in the channel setting process, transmit a second output optical signal including the first input channel information and a second output channel information indicating a channel of the second output optical signal.

2. The optical transceiver according to claim 1, further comprising a controller configured to control transfer of the first input channel information transferred by the optical receiver to the optical transmitter in a case where the optical receiver receives the first input optical signal.

3. The optical transceiver according to claim 2, wherein the optical receiver is configured to, in a case where the first input optical signal includes the first input channel information and a setting channel information, which is the first output channel information or the second output channel information, transfer the setting channel information, and
   wherein the controller is configured to set a channel of an optical signal transmitted by the optical transmitter based on the setting channel information.

4. The optical transceiver according to claim 2, wherein the controller is configured to, in a case where the optical receiver receives the first input optical signal, set a channel of an optical signal received by the optical receiver based on the first input channel information included in the first input optical signal.

5. The optical transceiver according to claim 1, wherein the optical transmitter is configured to change the channel of the first output optical signal for the first channel setting optical signal to a channel that has not yet been set as the channel of the first output optical signal, and then output the first output optical signal before the optical receiver receives the first input optical signal.

6. The optical transceiver according to claim 1, wherein the optical transmitter is configured to stop to change the channel of the first output optical signal after the optical receiver receives the first input optical signal.

7. The optical transceiver according to claim 1, wherein the optical transmitter comprises:
   a driver configured to output a drive signal according to an input signal; and
   a wavelength variable optical signal transmitter configured to output a modulated optical signal according to the drive signal, and
   wherein the controller is configured to control the driver so that the first output optical signal, which has been on/off-modulated according to the drive signal, is output from the wavelength variable optical signal transmitter.

8. An optical communication system comprising:
a first optical transmission apparatus configured to be attached to a first optical transceiver;
a second optical transmission apparatus configured to be attached to a second optical transceiver; and
an optical cable connecting the first optical transceiver and the second optical transceiver with each other,
wherein the first optical transceiver comprises:
an optical transmitter; and
an optical receiver,
wherein the optical transceiver is configured to autonomously start a channel setting process in a case where the first optical transceiver is attached to the first optical transmission apparatus,
wherein the optical transmitter is configured to, in the channel setting process, transmit, to the second optical transceiver, a first output optical signal including a first output channel information indicating a channel of the first output optical signal;
wherein the optical receiver is configured to, in the channel setting process, receive, from the second optical transceiver, a first input optical signal including a first input channel information indicating a channel of the first input optical signal; and
wherein the optical transmitter is configured to, in the channel setting process, transmit, to the second optical transceiver, a second output optical signal including the first input channel information and a second output channel information indicating a channel of the second output optical signal.

9. The optical communication system according to claim 8, wherein the channel setting process is autonomously started in response to the optical transceiver being attached to an optical transmission apparatus.

10. A method of an optical transceiver, the method comprising:
starting autonomously a channel setting process in a case where the optical transceiver is attached to an optical transmission apparatus,
wherein the channel setting process comprises:
transmitting a first output optical signal including a first output channel information indicating a channel of the first output optical signal;
receiving a first input optical signal including a first input channel information indicating a channel of the first input optical signal; and
transmitting a second output optical signal including the first input channel information and a second output channel information indicating a channel of the second output optical signal.

11. The optical transceiver according to claim 1, wherein the channel setting process is autonomously started in response to the optical transceiver being attached to the optical transmission apparatus.

12. The method of an optical transceiver according to claim 10, wherein the channel setting process is autonomously started in response to the optical transceiver being attached to the optical transmission apparatus.

* * * * *